United States Patent [19]

Rotolico et al.

[11] 4,391,860
[45] Jul. 5, 1983

[54] DEVICE FOR THE CONTROLLED FEEDING OF POWDER MATERIAL

[75] Inventors: Anthony J. Rotolico, Hauppauge; Eduardo Romero, Coram; John E. Lyons, Levittown, all of N.Y.

[73] Assignee: Eutectic Corporation, Flushing, N.Y.

[21] Appl. No.: 237,092

[22] Filed: Feb. 23, 1981

Related U.S. Application Data

[63] Continuation-in-part of Ser. No. 226,756, Jan. 21, 1981.

[51] Int. Cl.$^3$ .......................... B05D 1/08; B05B 7/14; B05B 7/20
[52] U.S. Cl. .................................. 427/423; 427/201; 118/308; 118/311; 239/61; 239/325; 406/12; 406/14; 406/28; 406/29; 406/118; 406/137; 406/144
[58] Field of Search ............... 427/201, 423, 424, 426, 427/427; 118/311, 308; 239/61, 325; 406/12, 14, 28, 29, 118, 137, 138, 144

[56] References Cited

U.S. PATENT DOCUMENTS

| | | | |
|---|---|---|---|
| 2,571,608 | 10/1951 | Plagge | 118/311 X |
| 2,817,310 | 12/1957 | Ponzini | 118/308 X |
| 2,919,160 | 12/1959 | Blackburn | 406/144 X |
| 2,998,322 | 8/1961 | Strate | 427/201 X |
| 3,020,182 | 2/1962 | Daniels | 427/426 X |
| 3,163,329 | 12/1964 | Mornas | 406/30 X |
| 3,220,778 | 11/1965 | Aller | 406/118 |
| 3,365,242 | 1/1968 | Marchett | 406/14 |

*Primary Examiner*—Shrive P. Beck
*Attorney, Agent, or Firm*—Hopgood, Calimafde, Kalil, Blaustein & Judlowe

[57] ABSTRACT

The invention contemplates a powder-feeding system for gas-propelled delivery of a powder to be controllably supplied, as to a flame-spraying gas torch or to a transferred-arc plasma torch. A fluidizing chamber receives (a) fluidizing-gas flow from below a porous screen, and (b) a restricted gravitational flow of powder at a relatively small central discharge location above the porous screen. A gas conduit extends transversely through the chamber between the powder-discharge location and the porous screen; it has a carrier-gas supply connection at one end and a gas-propelled powder-delivery connection at its other end. The conduit also has an upwardly extending opening virtually beneath and facing the powder-discharge location, but a shed interposed between this opening and the powder-discharge location sufficiently overlaps the opening to assure that no powder will pass through the opening and into the conduit unless it has been gas-fluidized. The powder-discharge flow is blocked to gas flow when powder is being delivered by the carrier-gas flow, but the powder delivery is terminated promptly upon gas-venting the fluidizing chamber, via the powder-discharge flow or otherwise.

A multiple-unit combination of such a system is also described wherein the proportion of different gas-fluidized powders may be selectively varied and/or coordinated to achieve various different application objectives, as in the course of a single run of a flame-spraying torch served by such combination.

17 Claims, 12 Drawing Figures

DEVICE FOR THE CONTROLLED FEEDING OF POWDER MATERIAL

RELATED CASE

This application is a continuation-in-part of my copending application, Ser. No. 226,756, filed Jan. 21, 1981.

BACKGROUND OF THE INVENTION

The invention relates to a powder-feeding system for gas-propelled delivery of a powder to be controllably supplied, as to a flame-spraying gas torch or to a transferred-arc plasma torch.

Various schemes have been proposed for the aspiration of powder into a flow of carrier gas, but these have lacked the precision with which it is desirable to controllably meter the delivery of powder to a torch for torch deposition to a surface to be coated or otherwise treated by the powder.

U.S. Pat. No. 3,976,332 attacks the problem by so configuring a downwardly open orifice in a carrier-gas tube within the convergent lower region of a powder-supply hopper that, in the presence of a fluidizing-gas flow from the top of the hopper and through the body of powder in the hopper, a fluidized powder regime will be established in the immediate vicinity of the orifice, thereby providing fluidized powder under pressure for conveyance by the carrier-gas flow. This technique has the disadvantage that the pressure drop of fluidizing-gas must necessarily be some function of the instantaneous head of undischarged powder within the hopper. And the the patentee discloses a vibrator on the hopper wall as an aid in agitating undischarged powder in order to reduce this pressure drop.

BRIEF STATEMENT OF THE INVENTION

It is an object of the invention to provide an improved powder-feeding system of the character indicated, avoiding disadvantages of existing systems.

It is a specific object to meet the above object with a fluidizing powder-feeding system which, in its powder-feeding mode, avoids flow of fluidizing gas through any part of the hopper which contains the powder supply.

Another specific object is to meet the above objects with a fluidizing system which relies solely on gravity for restricted admission of powder to a fluidizing zone, the latter being otherwise separate from the hopper and its powder supply.

A further specific object is to meet the above objects with a fluidizing system in which, for a given range of controlling the pressure of fluidizing-gas delivery to the fluidizing zone, and for a given powder in loose particulate form, the rate of powder delivery is a substantially linear function of the controlled pressure of fluidizing-gas delivery.

Still another specific object is to provide a system of the character indicated wherein different powder materials may be delivered by fluidizing gas to a single utilizing device in proportions which can be varied in the course of a single run.

A general object is to meet the above objects with relatively simple, readily serviced structure, inherently capable of powder-delivery at predetermined rates.

The invention achieves the foregoing objects and other features by providing a fluidizing chamber which is independent of the powder-supply hopper, except for a restricted vertical passage which permits solely a limited gravitational flow of powder into the fluidizing zone. The point of powder discharge into the fluidizing chamber is close to a shed which shields one or more openings through which fluidized powder is driven into a carrier-gas conduit, depending on the pressure of fluidizing-gas supply. A porous screen at the bottom of the fluidizing chamber assures distribution of fluidizing gas over a relatively large area which is at least coextensive with the shed. To cut off the powder-feed action, the fluidizing chamber is vented by venting the hopper.

In the case of multiple powders to be carrier-gas delivered in selectively varied proportions, multiple hoppers of the character indicated are used, one hopper for each different powder material to be delivered, and the carrier-gas (powder-delivery) outlets of all such hoppers are combined to provide a single carrier-gas delivery of the mixed powders. Control of the mix is by control of the respective fluidizing-gas supplies to the particular hoppers.

DETAILED DESCRIPTION

Preferred embodiments of the invention will be described in detail in connection with the accompanying drawings, in which.

Figure 5:
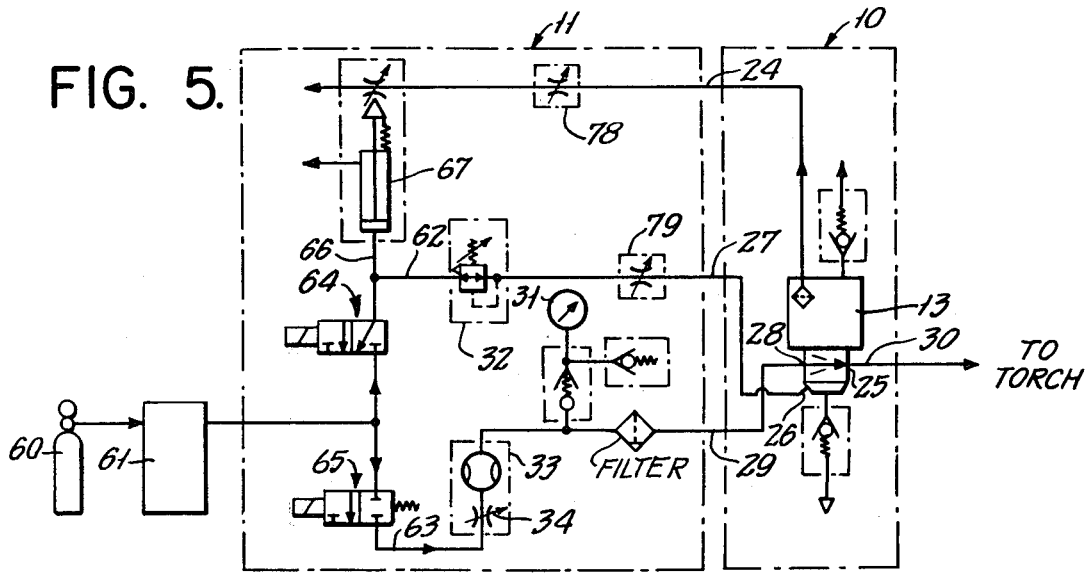
FIG. 5 is a diagram schematically indicating gas-flow control connections for the apparatus of FIGS. 1 to 4.
Figure 6:
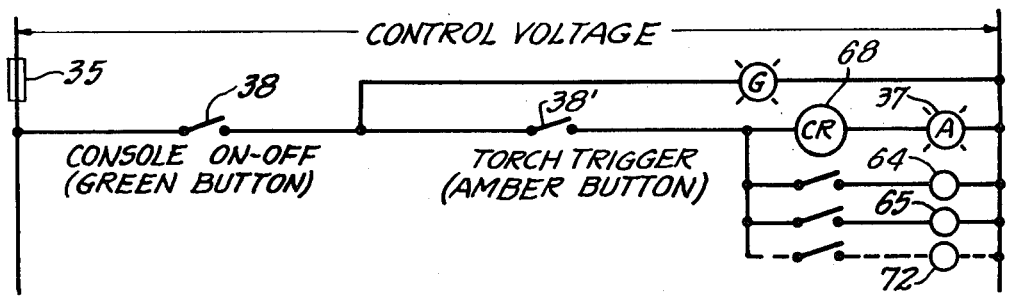
FIG. 6 is an electrical ladder diagram for electrical circuitry associated with components of FIGS. 5 and 5A.
Figure 7:
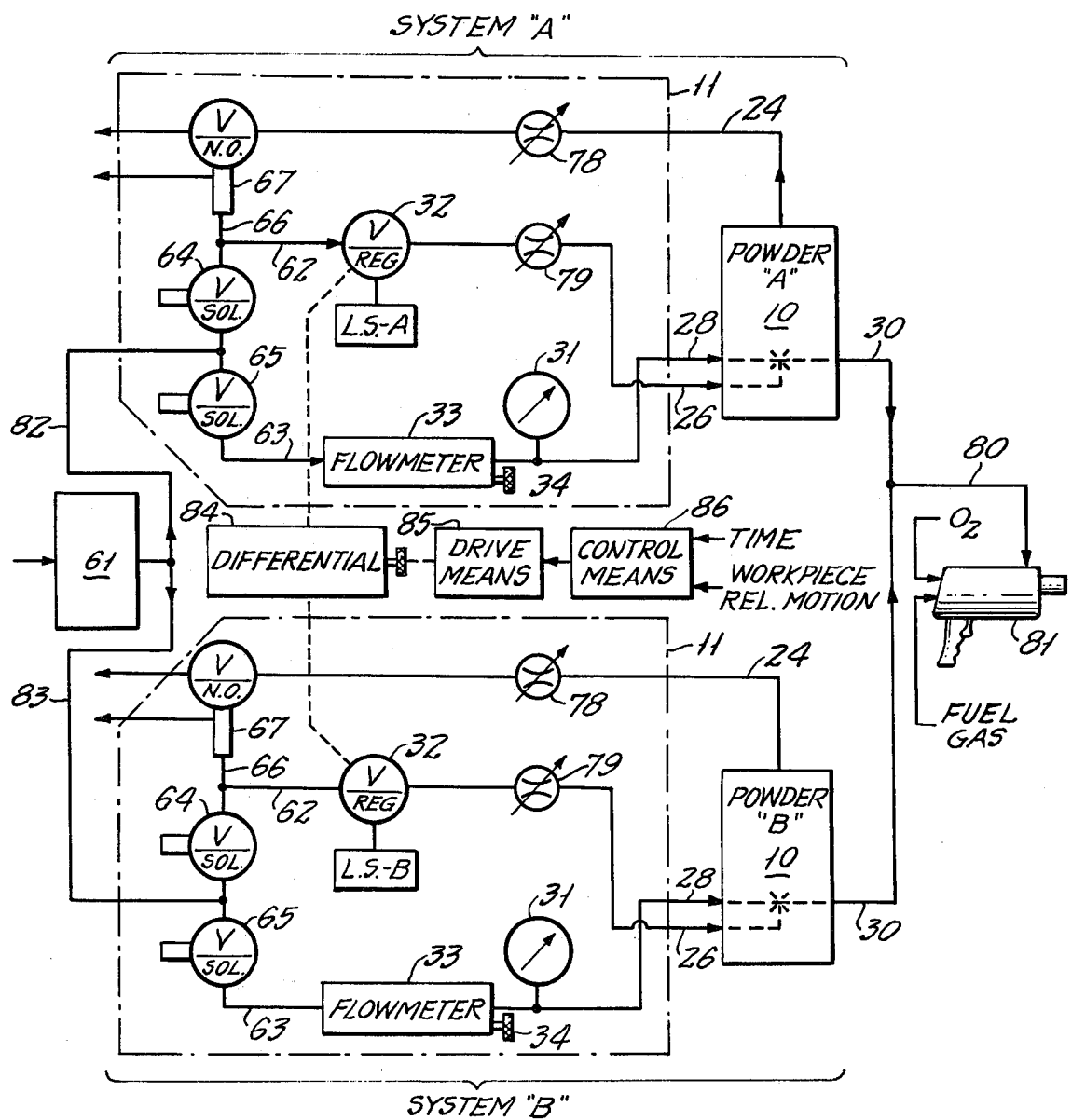
Figure 8:
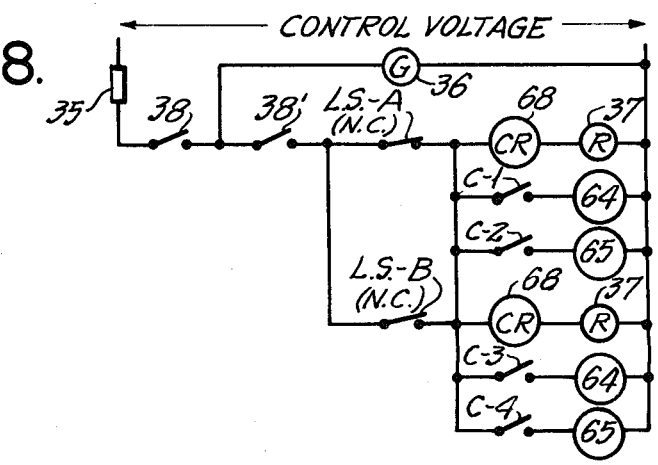
Figure 9:
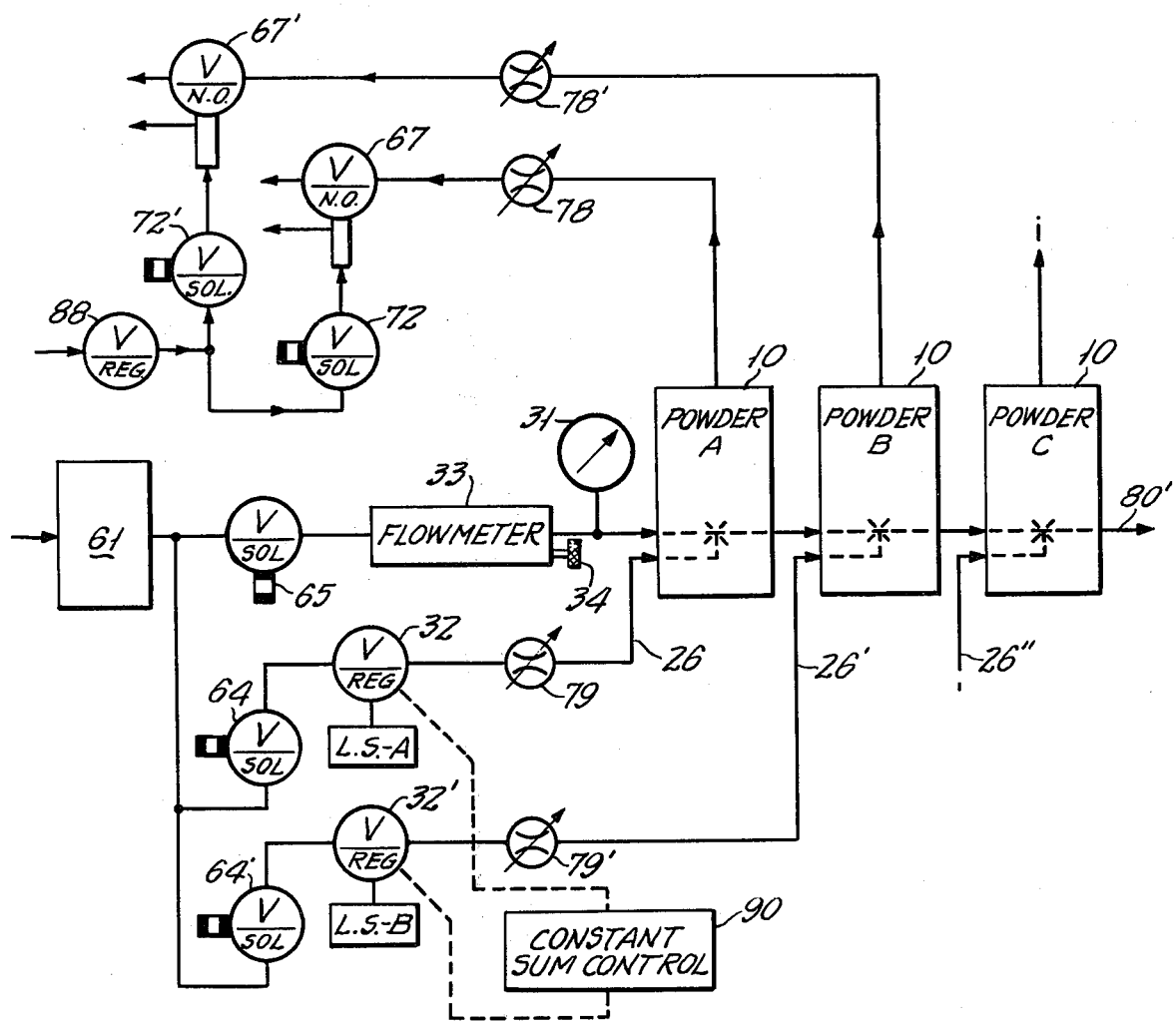
Figure 10:
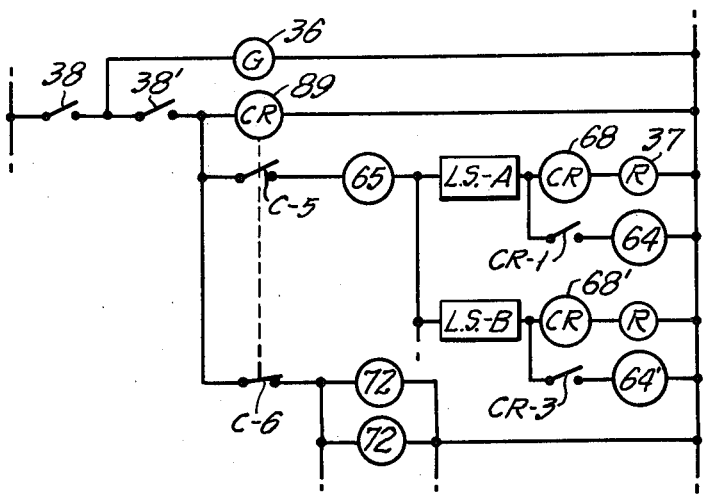

FIGS. 7 and 8 are diagrams which correspond to FIGS. 5 and 6, to illustrate another embodiment; and FIGS. 9 and 10 are further diagrams corresponding to FIGS. 5 and 6, to illustrate a further embodiment.

Figure 1:
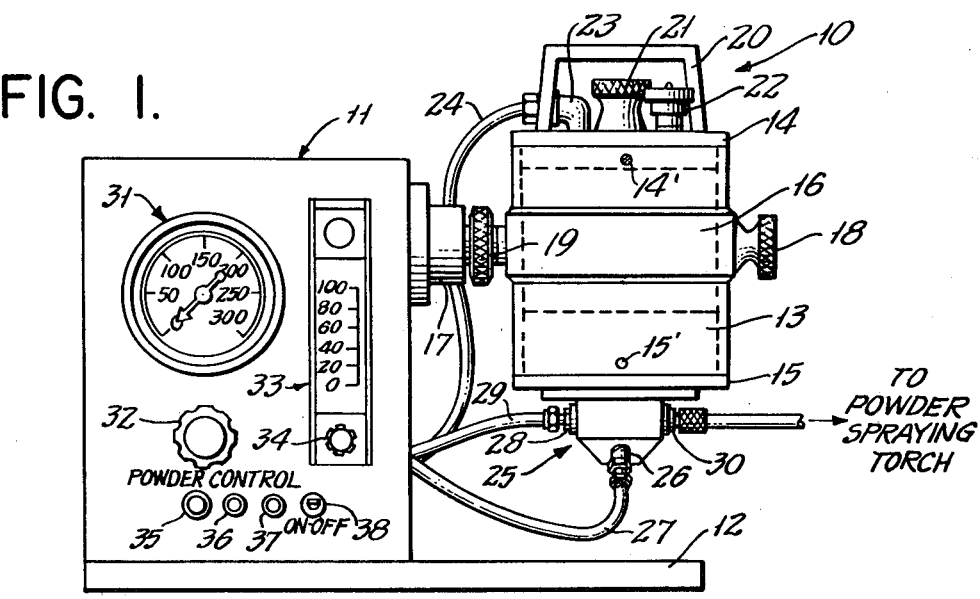
FIG. 1 is a front elevation of control and hopper-associated components of powder-feed apparatus of the invention.

In the embodiment of FIG. 1, a powder-supply and dispensing unit 10 and its controls unit 11 are shown carried by a base 12. The unit 10 includes a cylindrical hopper body 13, with flanged upper and lower end-closure members 14–15, for containment of a supply of powder to be controllably dispensed; members 14–15 have telescoping fit to the bore of body 13 and are removably secured thereto, as at 14'–15'. A circumferential band 16 secured to body 13 provides means for pivotally supporting unit 10 about a horizontal pivot axis, via fixed mounting-hub structure 17 forming part of the housing of the control unit 11. An externally accessible knob 18 facilitates selective orientation of unit 10 about its pivot axis, the orientation being releasably secured by clamp means including a knurled ring 19.

The upper closure member 14 includes a handle 20 (for portability), a removable plug 21 (for powder-filling access to the inner volume of the hopper), a pressure-relief valve 22 (for safety, in the unlikely event of blockage to flow of gas under pressure), and a vent-connection fitting 23 from the inner volume of the hopper, and via flexible-hose connection 24, to vent-control means within unit 11.

The lower closure member 15 includes a gas-fluidizing chamber body 25 which will later be explained to receive a restricted gravitational supply of powder from within the hopper body 13. A fluidizing-gas supply connection 26 is made to the lower region of body 25, with flexible hose connection 27 to control means at 11; and a horizontal tubular powder distributor (to be described in connection with FIGS. 2, 3, and 4) has an inlet-end connection 28 for admission of a carrier-gas supply via a flexible hose 29 to further control means at 11. The other end 30 of the powder distributor is adapted for flexible-hose connection to a powder-spray torch or the like, as suggested by legend.

Externally exposed at the panel of control unit 11 is an indicator 31 of instantaneous back pressure, for carrier gas supplied in line 29 to the powder-distributor inlet connection 28; in the absence of powder injection, the indicator 31 will read a pressure which reflects the downstream impedance attributable to the powder distributor and its output connections, i.e., including the line to the utilizing torch. A knob 32, labeled "Powder Control", is in reality a manual means of adjustment of a pressure-regulator valve in the fluidizing-gas supply to line 27; when knob 32 is turned in the direction to admit a flow of fluidizing gas to connection 26, the back pressure reading at 31 will rise, almost directly in proportion to the rate of powder supply via the powder distributor, hence, the label "Powder Control" at knob 32. A second or flowmeter indicator 33 provides current readings of carrier-gas flow (being a pressure reading indicative of such flow) in the line 29 to connection 28; and an associated adjustment knob 34 governs a variable orifice and is therefore a means of selecting flow rate, in re carrier gas supplied to inlet 28. A fuse 35, green and amber lamps 36–37, and an on-off switch 38 complete the panel; one of these lamps reveals the condition of switch 38, and the other lamp reveals the condition of an electrical relay (to be later described) which may be operated by remote on-off switch.

Figure 2:
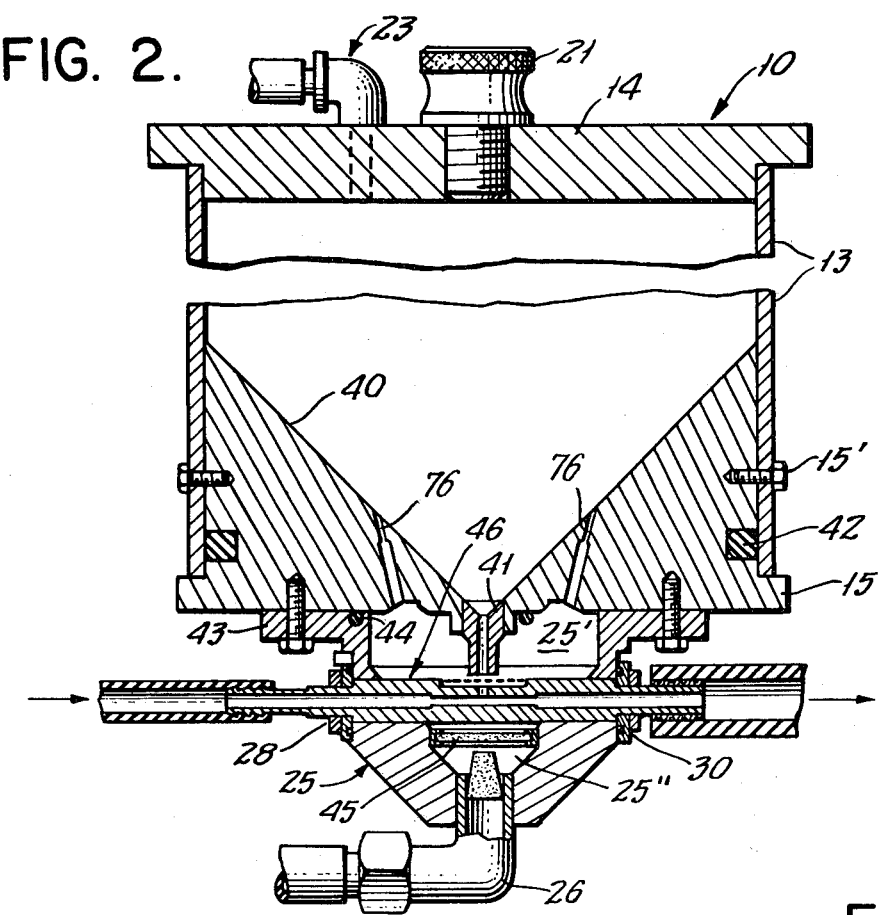
FIG. 2 is an enlarged vertical sectional view through the hopper-associated components of FIG. 1.
Figure 3:
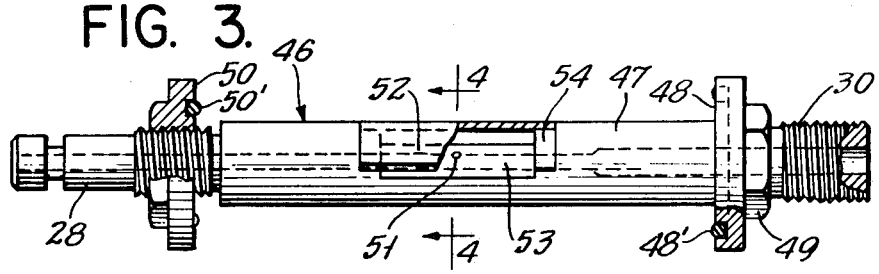
FIG. 3 is a further enlarged view in elevation of powder-distributor structure in the apparatus of FIGS. 1 and 2, said view being partly broken-away and in vertical section.
Figure 4:
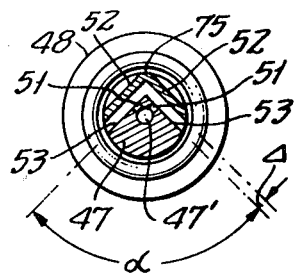
FIG. 4 is a sectional view taken at 4—4 in FIG. 3.

Referring now to FIGS. 2, 3 and 4 for internal detail, the lower end closure 15 of the hopper is seen to provide a conically dished bottom surface 40 for the hopper and to be provided (at its vertex) with a restricted vertical powder-discharge fitting 41, the conical slope of the concavity being preferably at least as steep as the angle of repose of the powder; an O-ring seal 42 assures powder-retaining integrity of the hopper bottom. The fluidizing-chamber body 25 is seen to be a flanged upwardly open cup, the open end of the cup being closed to complete definition of the fluidizing chamber, when the body flange 43 is secured to closure 15; an O-ring seal 44 assures powder-retaining integrity of the flange connection.

As shown, the fluidizing chamber comprises an upper region 25′ of relatively large sectional area and a lower region 25″ of relatively small sectional area, with a conical connecting zone of convergence from region 25′ to region 25″, the angle of convergence being preferably as steep as the angle of repose for powder to be distributed and fed. A gas-permeable porous screen (or microfilter) 45, as of porous bronze, seats in a short counterbore contour of the lower region 25″, above the elevation of fluidizing connection thereto (fitting 26), so that fluidizing gas flow will be distributed over the area of screen 45, as this flow discharges into the conical-connecting zone and into the upper region of the fluidizing chamber. The restricted-passage fitting 41 via which powder gravitationally enters the fluidizing chamber preferably projects downwardly through the upper region 25′ for powder discharge into the convergent zone, in vertically spaced offset from screen 45.

The powder distributor 46, which extends horizontaly from its carrier-gas inlet end 28 to its powder-delivery discharge end 30 is best shown in FIGS. 3 and 4. Advantageously, it comprises an elongate cylindrical body 47 having a central through-passage 47′ for accommodating a flow of carrier gas. Its body 47 is removably insertable in horizontally aligned and diametrically opposed mounting bores through the fluidizing body 25, preferably in the convergent zone, being vertically interposed in clearance relation between the porous screen 45 and the powder-discharge end of fitting 41. Clamp nuts threaded to the respective ends of distributor body 47 may be used to clamp the same between local flats on the outer surface of body 25; however, in the form shown, the outlet end 30 of distributor body 47 includes an integral flange 48 with adjacent wrench flats 49 to enable a spanner-retained angular orientation while securing the same via a clamp nut 50 to threads at the inlet end 28. O-ring seals 48′–50′ in the axially inner faces of flange 48 and nut 50 assure powder-retaining integrity of powder distributor 46 when in clamped assembly to body 25.

At a locally recessed central region of the distributor 46, one or more upwardly directed openings 51 enable powder fluidized within body 25 to enter the central passage of body 47 and thus to be conveyed via means 30 to torch to other utilization means. And a shed 52 carried by body 47 is interposed in vertical clearance relation between opening(s) 51 and the powder-discharge end of fitting 41. As shown, the central recess is defined by milled flats 53 parallel to the axis of body 47 and oppositely sloped at an included angle $\alpha$ which is at least no greater than twice the angle of repose of the powder, thereby assuring that when correctly oriented with respect to the vertical plane which includes the axis of body 47, no powder can adhere to either of the surfaces 53. Ledges 54 at longitudinal ends of the recess are parallel to adjacent flats 52 and at offset $\Delta$ therefrom, to provide precise and bonded seating for the respective roof panels of shed 52; these panels may be bent from flat stock, at the angle $\alpha$, and the panel thickness is such that the complete shed 52 is accommodated within the geometrical cylinder of body 47, thereby enabling the above-described removably insertable relation, in regard to fluidizing-chamber assembly. It is also noted that the lower edge limits of the roof panels are both at an elevation well below that of the opening(s) 51, thereby assuring against any direct entry of powder from fitting 41 to opening(s) 51.

In operation, the hopper 10 with a supply of powder to be gas-delivered at 30 is closed, i.e., no venting is available at 23–24. A predetermined flow of carrier gas is selected at 34, based on the indication at 33, and the back-pressure is noted at 31, for this no-powder condition. Thereafter, a predetermined powder flow is established by turning knob 32 to start and to increase the pressure-regulated flow of fluidizing gas in line 27 to the inlet 26 to chamber 24. The knob (32) setting will be such as to produce at 31 an indication of increased back pressure, the particular increase having been determined to be that which will produce the desired flow of powder via the distributor opening 51. As previously noted, any such knob(32)-operated change in the back pressure (indicated at 31), i.e., change in the back-pressure increase above the base reading for no-powder flow, will be substantially directly proportional to the powder flow. The immediate result of these selections, in the context of having operated switch 38 (and a remote-control switch, e.g., at the torch) to its "on" condition, is to cause the distributed flow of gas (issuing from screen 45) to operate upon and thus to fluidize such limited quantity of powder as may have been able to enter the fluidizing chamber and to drop from shed 52 to the screen. The fluidized powder quickly becomes uniformly dispersed throughout the volume of the fluidizing chamber, and the flow thereof via opening(s) 51 must be and is a direct function of the setting at 32. The effective area of openings(s) 51 is preferably less than that of the powder-discharge passage at 41, so that, as soon as hose 24 is vented, the ability to drive fluidized powder to or through opening 41 ceases altogether, thus immediately terminating the supply of powder via outlet 30.

In the electropneumatic circuitry of FIG. 5, many of the already identified components are schematically shown and are therefore given the previously assigned reference numbers. Basically, a single source 60 of gas under pressure (e.g., an inert gas, such as argon) is made available via supply control means 61 to separate lines 62–63 serving the variable pressure regulator 32 and the variable restrictive orifice 34 of a constant-flow flowmeter 33. Suitable solenoid-operated valves 64–65 in each of the lines 62–63 determine the on-off condition of gas flow therein. To coordinate venting of line 24 with the "off" condition of valve 64, a branch line 66 is shown operative upon the single-acting piston of a cylinder 67, wherein piston displacement against a return spring is necessary in order to pinch and thus close a flexible (e.g., neoprene tube) section of line 24. The pinched (closed) condition of line 24 assures against gas flow in or through the hopper, so that powder can be fluidized within chamber 25 and expelled only to outlet 30; on the other hand, the unpinched (open, venting) condition of line 24 dissipates pressure within the fluidizing chamber 25, to the extent that this pressure is insufficient to drive any fluidized material through the opening(s) 51.

The ladder diagram of FIG. 6 illustrates electrical control connections for coordinating above-described functions. In this diagram, the on-off switch 38 determines overall electrical availability for operation, and a further on-off switch 38' (the remote-control switch alluded to above) determines whether a contactor relay 68 will be excited; as also noted above, the switch 38' may be operated by the torch trigger, in the event that the powder supply is to such a torch. Relay 68 has a plurality of normally open contacts (C1, C2, C3), which close simultaneously upon relay excitation. Contact C1 is connected for operation of the solenoid for normally closed valve 64, and contact C2 is connected for operation of the solenoid for normally closed valve 65.

Figure 5A:
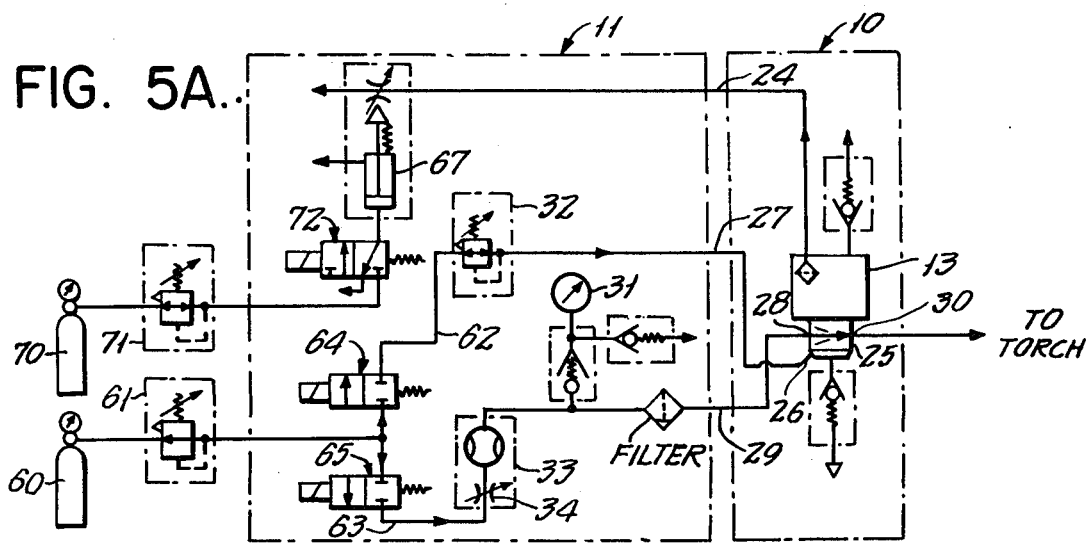
FIG. 5A is a diagram similar to FIG. 5 to show a modification.

In the modified electropneumatic circuitry of FIG. 5A, an independent supply 70 of pressurized gas (e.g., air) is made exclusively available for pinch control of the vent mechanism. For this purpose, the branch line 66 of FIG. 5 is replaced by series-connected pressure-regulator means 71 and normally open solenoid-valve means 72. And the C3 contact connections of FIG. 6 determine excitation of the solenoid of valve means 72, in unison with the other two solenoid valves 64–65.

It will be appreciated that certain dimensions of the described apparatus are dependent upon the size and density of the particulate powder material employed. Thus, the truncation slopes 53 should be at least as steep as the angle of repose of the powder material, and if flat (as shown) the roof panels 52 should meet the same slope requirement. The area of overlap provided by shed 52 over and beyond opening(s) 51 should be so extensive as to avoid any chance of direct powder travel from passage 41 to opening(s) 51. The combined sectional area of opening(s) 51 is preferably less than that afforded for venting chamber 25 via means 24. The length of each opening 51, from a flat 53 to the carrier-gas passage 47', is preferably about the effective diameter of the opening 51, or less. And the effective sectional area of each opening 51 is much smaller than the sectional area of the carrier-gas passage 47', at juncture therewith. Preferably also, the juncture of roof panels 52 is characterized by a narrow horizontal flat 75 (FIG. 4) which extends the full length of the shed, and the width of said flat is approximately the discharge diameter of the powder passage 41, while said flat is spaced from passage 41 to about the same extent, thus enabling an effective throttling of powder admission to chamber 25, in the absence of fluidizing conditions.

It will be seen that the described powder-feeding apparatus meets all stated objectives, and that the principle of operation is applicable to a variety of powder-feeding uses, involving various types of dry materials, for purposes other than the described context for supplying powder to a torch. The screen 45 diffuses the fluidizing gas and assures that powder will be fluidized (and therefore will not permit a powder surge) during any given delivery cycle. The ability to deliver powder for any given application will depend upon the number of openings 51 beneath shed 52. For example, for a particular metal powder to be fluidized and supplied by the described apparatus, the following different ranges of powder feed rate are available with the same size distributor body 47 wherein only the size and/or number of openings 51 is modified:

Low Range—0.5 lb/hour to 8 lbs/hour
Medium Range—4 lbs/hour to 22 lbs/hour
High Range—10 lbs/hour to 35 lbs/hour
Super High Range—15 lbs/hour to 50 lbs/hour In the specific case of feeding a flame-spraying metallic powder identified as Eutoloy #16496, being a commercially available alloy* product of Eutectic Corporation, New York, the above-stated low range is achievable for the described condition of two openings 51, where each opening 51 is of 0.041-inch diameter and perpendicular to its associated flat 53, where each opening 51 is 0.03-inch long and the carrier-gas passage 47' is of 0.067-inch diameter at juncture with openings 51, the shed gap (i.e., offset Δ of roof panels 52 to adjacent flats 53) being 0.060-inch. The foregoing operation is achieved for selected constant flow-rate of carrier gas at 15 to 20 standard cubic feet per hour, while the fluidizing gas pressure is regulated within the range 0.5 to 5 psi. Generally speaking, for the indicated specific powder and application, the length of openings 51 (i.e., from passage 47' to the associated flat 53) is preferably in the range 0.010 to 0.030 inch, and the shed gap Δ is preferably in the range 0.015 to 0.060 inch.

*An alloy of nickel, chromium, boron and silicon

As long as the supply of powder in hopper 13 is sufficient to cover the opening of the restrictive feed element 41, and, of course in the circumstance of such powder being free-flowing, the powder level in hopper 13 has no effect on the powder-delivery rate at 30. Repeatability is found to be in the range ±3 percent, and the back-pressure reading at 31 (i.e., above the back-pressure reading for no powder flow) is found to be directly proportional to the feed rate for a specific material and powder lot.

Figure 3A:
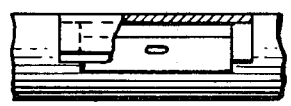
FIG. 3A is a fragmentary view of an alternative arrangement for what is shown in a portion of FIG. 3.

It will be understood that modification of the described powder-feeing mechanism (associated with a given hopper 13) can be made without departure from the scope of the invention. For example, as a means of enlarging the effective area for fluidized-powder entry to passage 47', without reducing the elevation thereof above the lower limiting edges of shed 52, the opening may be of slotted nature, exemplified by the longitudinally elongate slot 51' of FIG. 3A. Also, to increase the effective sectional area through which the venting of chamber 25' is achieved via hopper 13, an angularly distributed plurality of vent passages 76 (see FIG. 2) may be provided in end closure 15; the size of these openings 76 should be less than sufficient to admit powder to chamber 25', and they are shown with a divergent pattern of distribution at that they may serve the function of transiently agitating the lower region of the hopper upon each vented termination of fluidized-powder delivery.

Still further, in certain cases, it is found desirable to avoid sharp transients in the starting and/or in the termination of powder feed. This is achievable by providing a bleed orifice 78 in series relation with the venting line 24, in the case of powder-feed termination, and a bleed orifice 79 in series relation with the fluidizing-gas inlet line 27, in the case of a start-up of powder feed. Preferably, each of these orifices 78-79 is selectively adjustable to accommodate the conditions of a particular job; orifices 78-79 may thus each be a needle valve, as schematically suggested in FIG. 5.

Inherent in the arrangement just described, wherein each of the orifices 78-79 is an adjustable needle valve, is the ability to create a "feathered" start and/or a "feathered" tail end to a given torch deposit upon a workpiece which has relative transverse motion with respect to the torch-deposition alignment. For example, for a torch-applied bead on a transversely manipulated workpiece surface, and for a given setting of the bleed valve 79, the build-up of fluidizing-gas flow will be gradual, meaning a correspondingly gradual "feathered" starting build-up of the desired bead to full height and width. In the event of such a bead applied to a rotating workpiece, the fluidizing-gas flow may remain at maximum (after this gradual build-up), and by commencing the vent action at 67 upon or near completion of a revolution of the workpiece, a gradually reducing "feathered" tail of the bead may be caused to lap the "feathered" start of the bead, due to the delay in venting occasioned by the preset bleed restriction at 78.

The remaining drawings deal with combination systems whereby different sources of fluidized powder are combined to serve a particular utilization device, such as a flame-spraying torch. In FIGS. 7 and 8, two systems (System A and System B) as previously described are interconnected in parallel to serve a single powder-supply line 80 to a single torch 81; in FIGS. 9 and 10, two or more such systems are connected in series to serve the single powder-supply line 80', as to a similar torch (not shown).

More specifically, in FIG. 7, each of the two Systems A and B may be of the nature described in connection with FIG. 5. The powder unit 10 and the control unit 11 of each of these systems is immediately recognizable, and components within these units are more schematically shown with their previously assigned reference numerals. Thus, the source of pressurized inert gas is provided by gas-control unit 61 in branch lines 82-83 to the respective Systems A and B, and once the solenoid valves 64-65 of each of these systems are energized, gas is admitted to close the vent valves 67 of both systems and to establish independent flows of carrier gas to the powder-unit inlets 28 of both systems, as well as independent flows of fluidizing gas to the powder-unit inlets 26 of both systems. Powder unit 10 of System A may be supplied with a first powder, and the rate of delivery thereof to line 80 will be a function of the setting of the regulating valve 32 of System A. Similarly, the powder unit 10 of System B may be supplied with a second powder, and the rate of delivery thereof to line 80 will be a function of the setting of the regulating valve 32 of System B. It is of course possible to make a single manual adjustment of each of the valves 32 to serve the purposes of a given torch-deposit run on a workpiece, but in the form shown a differential mechanism 84 mechanically interconnects the regulating valves 32, such that an opening displacement of one of them is accompanied by a closing displacement of the other, and vice versa. And since adjustment at either of valves 32 effects substantially linear control of the rate of associated powder assimilation in its carrier-gas flow, the described differential interconnection is operative to maintain a substantially constant total assimilation of powder in carrier gas delivered in line 80, even though the ratio of Powder A flow rate to Powder B flow rate may fluctuate between zero for one powder and full flow for the other.

FIG. 7 additionally shows that drive means to change the relation of valve 32 settings may be automated, through suitable control means 86 having a predetermined time response, or a response to a predetermined relative displacement of the workpiece with respect to the torch, all as suggested by legend in the drawing. Also, normally closed limit switches L.S.-A and L.S.-B associated with the respective regulator valves 32 of Systems A and B are provided to signify by the opening of either one of them that the fully closed (zero flow) condition thereof has been reached. The function of such switches will appear from discussion of ladder diagram of FIG. 8.

In FIG. 8, elements of FIG. 6 will be recognized from FIG. 6 and are therefore given the same identification. The only difference is that each of the normally closed switches L.S.-A and L.S.-B is connected to determine whether or not its associated solenoid valves 64-65 (fluidizing-gas flow, and carrier-gas flow, respectively) will be operated. Due to the normally closed nature of these switches, both fluidizing gas and carrier gas will flow in both System A and System B, the only exception being that, when one of the valves 32 is closed, the flow of fluidizing gas and of carrier gas will be shut down in the involved one of Systems A and B.

In the arrangement of FIG. 9, the single carrier-gas line 80' from control source 61 to the torch (not shown) serves to series-connect a plurality of independent power units 10, designated as being stocked with powders A, B ... C; the fluidizing-gas control systems for powders A, B ... C may be duplicates of each other, so that detail is omitted for the control system for powder C. Since there is but a single carrier-gas line (80'), only one set of solenoid valve (65), flowmeter (33) and back-pressure indicator (31) is provided, but each of the fluidizing-gas control systems will be recognized as having its solenoid valve (64, 64'), regulator valve (32, 32'), and bleed orifice (79, 79'), for input connection (26, 26', 26") to the respective powder units. Termination of powder feed via any one or more of the A, B ... C powder units is via opening of the associated normally closed venting valve (67, 67'), the rate of change from powder flow to no-powder flow being a function of the setting of the associated bleed orifice (78, 78'); in the form shown, a separate supply of pressurized gas (e.g., air) is available from a regulator 88 to the respective solenoid valves (72, 72') governing the venting operation.

In the ladder diagram of FIG. 10, for operation of the system of FIG. 9, the on/off and torch-trigger switches (38, 38') will be recognized. When these are both closed, a relay 89 is energized, to close its normally open contacts C-5, thereby energizing (to open) the carrier-gas solenoid valve 65 and, at the same time exciting the powder-flow control circuitry for each one or more of the systems A, B ... C, depending upon which of these systems is not closed off at its regulator valve (32, 32'), via is associated limit switch (L.S.-A, L.S.-B). When the supply of powder is to be terminated, the trigger switch 38' is released (opened), to drop out (close) the carrier-gas solenoid valve 65, and to close normally closed back contacts C-6 associated with relay; closure of contacts C-6 is seen to be effective to operate all venting solenoid valves (72, 72').

The described multiple-powder feeding systems (FIG. 7, FIG. 9) will be seen to afford precise control of specialized sophistication in sequencing and/or mixing of different fluidized powders supplied to a given torch. For example, ceramic powder (Powder A) may be phased in or out as a metal-alloy powder (Powder B) is phased out or in. Alternatively, powder Systems A and B may be stocked with the same powder and the phasing-in of one system while phasing-out the other may be utilized to assure constant (i.e., continuous) supply of the single powder while shutting down one system to permit its recharging with a fresh supply of powder. In FIG. 7, the differential mechanism 84 is designed to achieve this purpose, and in FIG. 9, a "constant sum control" 90 is provided for the purpose.

What is claimed is:

1. The method of supplying powder to a powder-deposition torch, which comprises selecting two powder-fluidizing systems each having the ability to selectively control the rate of its powder assimilation in a flow of carrier gas therethrough, supplying different gas-fluidizable powders to the respective systems, increasing the rate of powder assimilation in carrier-gas flow through one of said systems while decreasing the rate of powder assimilation in the carrier-gas flow through the other of said systems, combining the carrier-gas flows after powder-assimilation therein, and delivering the combined flow to the torch, the same carrier-gas flow being passed through the respective systems in succession, whereby the combining step occurs at passage of the carrier-gas flow through the second system.

2. The method of claim 1, in which the increasing rate commences at zero.

3. The method of claim 1, in which the decreasing rate is terminated at zero.

4. The method of claim 1, and thereafter decreasing the rate of powder assimilation in carrier-gas flow through said one system, while increasing the rate of powder assimilation in carrier-gas flow through said other system, and while continuing delivery of the combined flow to the torch.

5. The method of supplying powder to a powder-deposition torch, which comprises selecting two powder-fluidizing systems each having the ability to selectively control the rate of its powder assimilation in a flow of carrier gas therethrough, supplying different gas-fluidizable powders to the respective systems, varying the ratio of a powder-assimilation rate in carrier-gas flow through the respective systems, combining the carrier-gas flows after powder-assimilation therein, and delivering the combined flow to the torch, the same carrier-gas flow being passed through the respective systems in succession, whereby the combining step occurs at passage of the carrier-gas flow through the second system.

6. The method of claim 5, wherein the sum of the respective powder-assimilation rates is maintained substantially constant.

7. The method of claim 1 or claim 5, in which the powder supplied to one of said systems is ceramic and the powder supplied to the other of said systems is metallic.

8. The method of supplying powder to a powder-deposition torch, which comprises selecting two powder-fluidizing systems each having the ability to selectively control the rate of its powder assimilation in a flow of carrier gas therethrough, providing different supplies of the same powder to the respective systems, supplying the same single flow of carrier gas to both said systems in succsssion, varying the rate of powder assimilation in said single flow at one of said systems while varying in the opposite sense the rate of powder assimilation in said single flow at the other of said systems, the variation being from zero flow at one system and to zero flow at the other system, and delivering said single flow to the torch after passage through both systems.

9. The method of supplying powder to a powder-deposition torch, which comprises selecting two powder-fluidizing systems each having the ability to selectively control the rate of its powder assimilation in a flow of carrier gas therethrough, supplying different gas-fluidizable powder to the respective systems, supplying the same single flow of carrier gas to both said systems in succession, varying the rate of powder assimilation in said single flow at one of said systems, and delivering said single flow to the torch after passage through both systems.

10. Powder-feeding apparatus for carrier-gas delivery of a powder to be supplied to a torch or the like in loose particulate form, said apparatus comprising a carrier-gas line adapted at one end for connection to a source of carrier gas and adapted at its other end for connection to a torch or the like, and means for supplying a predetermined flow of carrier gas in said line, first and second powder-fluidizing chambers each having a fluidized-powder discharge-port connection to said line, said discharge-port connections being in succession in their connection to said line, a separate powder-supply means associated with each of the respective chambers, and a separate fluidizing-gas supply for each of said chambers, each fluidizing-gas supply being distinct and apart from the carrier-gas line and including a regulating valve connected to each of the respective chambers, whereby the setting of the respective regulator valves determines the respective rates of carrier-gas assimilation of the powders separately fluidized in the respective chambers.

11. Apparatus according to claim 10, in which control means having concurrent connection to both regulator valves is operative to maintain a predetermined relation between regulator-valve settings.

12. Apparatus according to claim 10, in which said relation is one of increasing fluidizing-gas flow to one of said chambers while decreasing fluidizing-gas flow to the other of said chambers.

13. Apparatus according to claim 11, in which said relation is selected to produce a substantially constant combined delivery rate for both fluidized powders to said line.

14. Apparatus according to claim 10, in which said line includes two branch lines for comingled delivery of separate carrier-gas flows in the respective branch lines, said first and second chambers being each associated with a different one of said branch lines.

15. Apparatus according to claim 10, in which said line is a single carrier-gas line with which said first and second chambers are each associated.

16. Apparatus according to claim 15, in which said first and second chambers are independently associated with said line in spaced succession in the direction of carrier-gas flow.

17. Apparatus according to claim 10, in which said first and second chambers are part of a larger plurality of such chambers, and in which said line is a single carrier-gas line with which each of said chambers is independently associated.

* * * * *